May 17, 1966     A. KORINEK     3,252,027
LAMINAR WINDINGS FOR DYNAMOELECTRIC MACHINES
Filed July 8, 1963     7 Sheets-Sheet 1

*INVENTOR.*

ANTON KORINEK

May 17, 1966     A. KORINEK     3,252,027
LAMINAR WINDINGS FOR DYNAMOELECTRIC MACHINES
Filed July 8, 1963     7 Sheets-Sheet 2

*INVENTOR.*
ANTON KORINEK

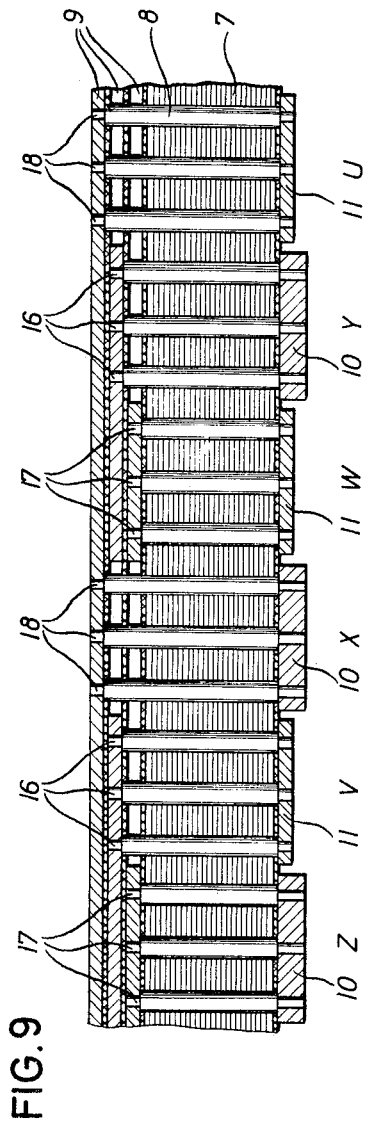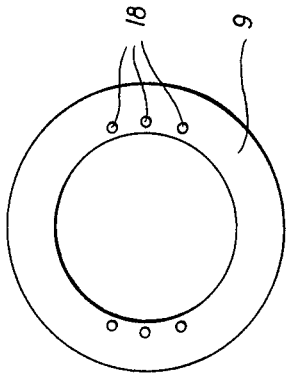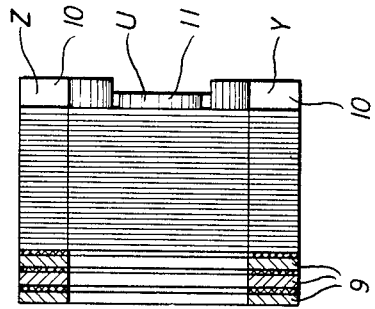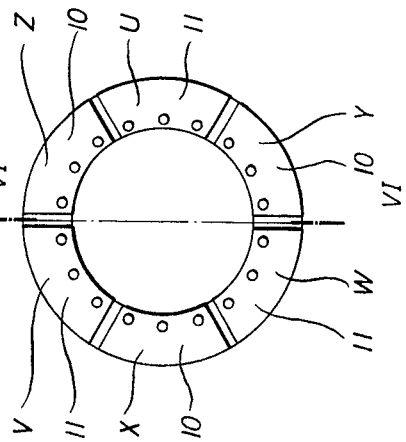
INVENTOR.
ANTON KORINEK

May 17, 1966  A. KORINEK  3,252,027
LAMINAR WINDINGS FOR DYNAMOELECTRIC MACHINES
Filed July 8, 1963  7 Sheets-Sheet 4

*INVENTOR.*

May 17, 1966    A. KORINEK    3,252,027
LAMINAR WINDINGS FOR DYNAMOELECTRIC MACHINES
Filed July 8, 1963
7 Sheets-Sheet 5

*INVENTOR.*

ANTON KORINEK

May 17, 1966  A. KORINEK  3,252,027
LAMINAR WINDINGS FOR DYNAMOELECTRIC MACHINES
Filed July 8, 1963  7 Sheets-Sheet 6

*INVENTOR.*

ANTON KORINEK

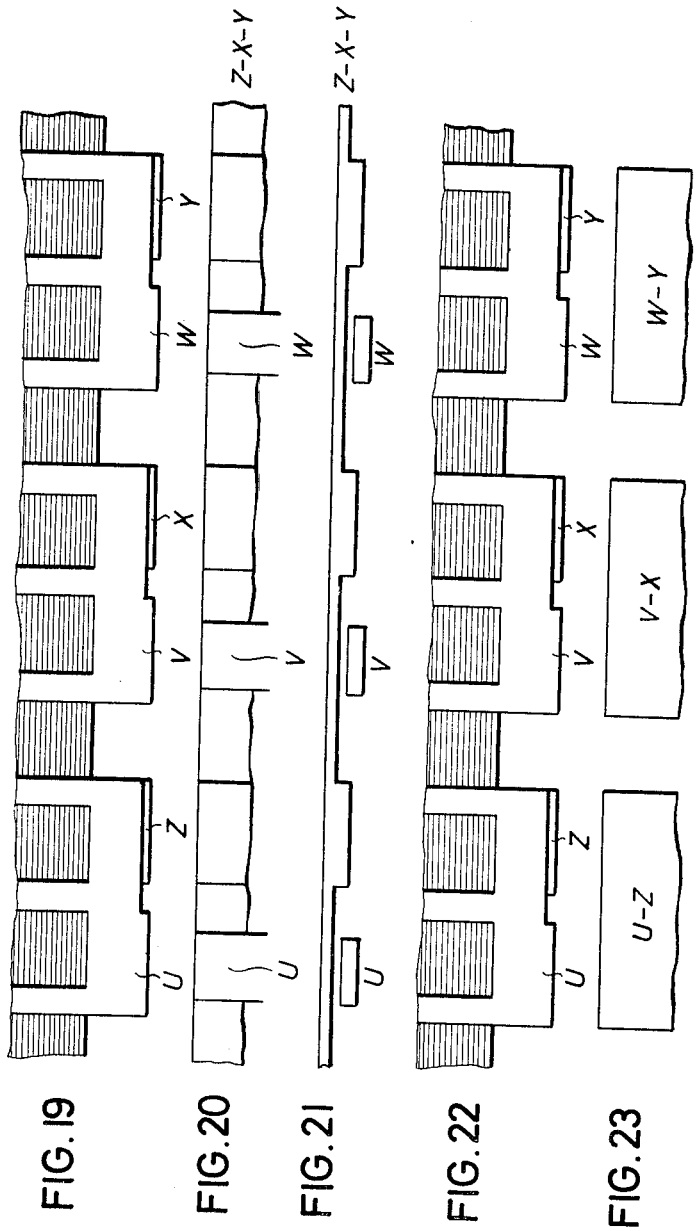

_United States Patent Office_ 3,252,027
Patented May 17, 1966

3,252,027
LAMINAR WINDINGS FOR DYNAMOELECTRIC MACHINES
Anton Korinek, Leutkirch, Allgau, Germany, assignor to Kaltenbach and Voigt, Biberach an der Riss, Germany
Filed July 8, 1963, Ser. No. 293,516
Claims priority, application Germany, July 9, 1962, K 47,185
10 Claims. (Cl. 310—198)

This invention relates to electric motors or generators, and more particularly to the fractional horsepower type for dental purposes wherein the fractional horsepower motor is so dimensioned that it can be built without difficulty into the handle of a dental handpiece.

Hitherto the stator windings of induction motors have been produced by laying coils wound from wire in slots of the stator lamination set, or by winding wire in individual windings into these slots. This method has in itself the disadvantage that it is not possible to maintain precise dimensions for the winding heads. This is very disadvantageous when producing such very small motors in that all the coil ends have to be connected by hand after the stator has been produced. But if the motor is to go below certain size limits, the motor stator can no longer be produced at all with the desired precision by using the hitherto known method, and mass production of the stators is, for practical purposes, impossible.

The invention has as an object the provision of an electric motor or generator whose stator can be produced in an extremely simple manner and with great precision even in the case of mass production, and which permits reducing the dimensions of the motor or generator to any desired extent.

The problem is solved in that, according to the invention, the stator windings consist of individual rod-like conductors which are inserted in the slots and which are connected together in groups. The groupwise connection of the rod-like conductors can be effected by short-circuit rings or segment-shaped short-circuit plates, and elastic pins and connecting plates formed by a cap, can be used as connections to the windings. Advantageously, the rod-like conductors belonging to one phase in each case and their electrical connections are formed from shaped parts, e.g. punched sheet metal members. Thus, the coils of the stator windings no longer consist of a plurality of turns, but have only a single turn. The limbs of this one turn winding are formed in each case by a rod-like conductor whose cross-sectional form corresponds exactly to the cross-sectional form of the stator slot. An optimum slot fullness factor is obtained by the introduction of these rod-like conductors into the stator slots, without insulation because of low operating voltage. Thus, for example, in the case of single-layer windings each slot contains only one conductor, or two conductors in the case of two-layer windings. If, in a multi-layer winding each slot contains more than one conductor, the individual cross-sections of these conductors must supplement one another in such a manner that the complete cross-section gives the shape of the stator slot and thus the optimum slot fullness factor is obtained.

After the mechanical production of the stator core and its windings in the manner described hereinbefore, the stator can have insulating synthetic plastic material, more particularly a casting resin, cast about it and then machined to close tolerances all over. In this, the end of the stator core which comprises the segment-shaped short-circuit plates, is freed again of the insulating layer so that the segment-shaped short-circuit plates can come into satisfactory electrical contact with the spring contacts and the annular or segment-shaped short-circuit plates situated in the cap of the motor.

The motor is supplied from the mains or from a battery through the agency of a possibly variable converter, which supplies the desired rotation frequency. The operating voltage of the motor will depend on the dimensions of the motor, the number and cross-section of its electrical conductors and its laminations, and is to be so calculated and determined that in conjunction with the optimum slot fullness factor an optimum utilisation factor is obtained i.e. an optimum output with the minimum outlay of lamination and conductor weights. For very high frequencies, ferrite material can be used for the core of the stator.

By choosing appropriate rotors, the motor can run as an asynchronous motor or as a synchronous motor with the stator according to the present invention. A squirrel-cage rotor will be provided for the asynchronous motor and a permanent-magnet rotor for the synchronous motor.

The same stator construction according to the invention can also be used advantageously for electrical generators of current having two or more phases, and more particularly for miniature generators.

For a better understanding of the invention and to show how the same may be carried into effect, reference will now be made, by way of example and not limitation, to the accompanying drawings in which:

FIGURE 6 is a plan view, to an enlarged scale, of a complete laminated stator core perpendicularly to the line VI—VI of FIGURE 7;

FIGURE 7 is a side view of the laminated stator core according to FIGURE 6 as seen from the right;

FIGURE 8 is a side view of the laminated stator core according to FIGURE 6 as seen from the left;

FIGURE 9 is a sectional developed view of the laminated stator core according to FIGURE 6;

FIGURE 10 and FIGURE 19 are arranged;

FIGURE 12 and FIGURE 20 are arranged;

FIGURES 19 and 20 show the lower part of the developed laminated stator core according to FIGURE 15 in conjunction with the appropriate switching and connecting elements of the closure cover;

FIGURE 21 is a plan view on to the switching and connecting elements of the closure cover according to FIGURE 20;

FIGURES 22 and 23 show the lower part of the developed laminated stator core according to FIGURE 15 in conjunction with the corresponding switching and connecting elements of the closure cover in an arrangement modified relatively to FIGURE 19.

Figure 1:
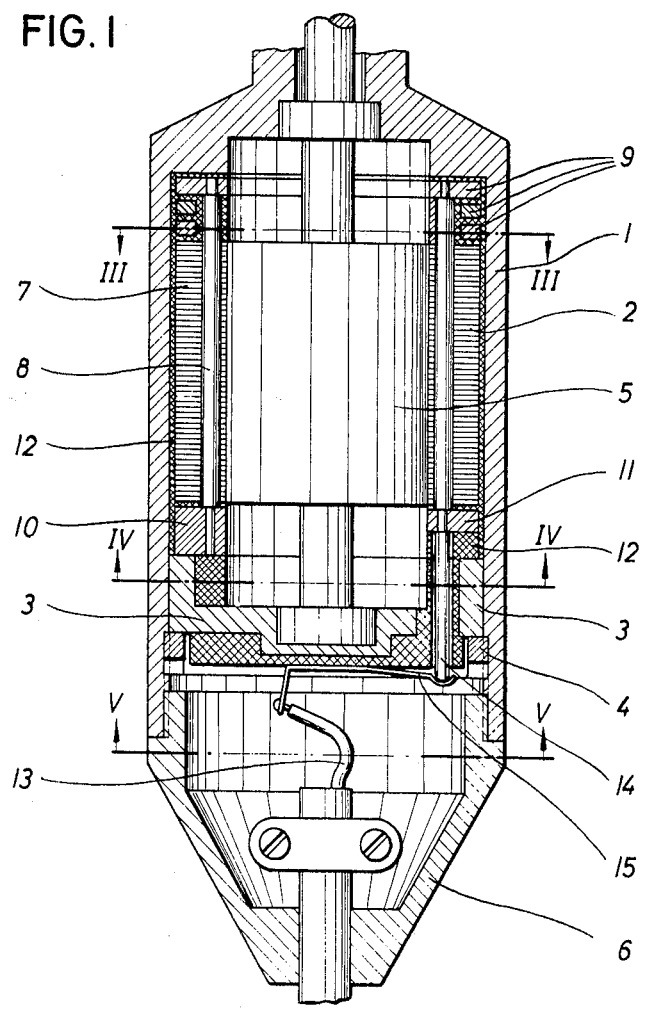
FIGURE 1 is a sectional view, to an enlarged scale, of a motor according to the invention.
Figure 3:
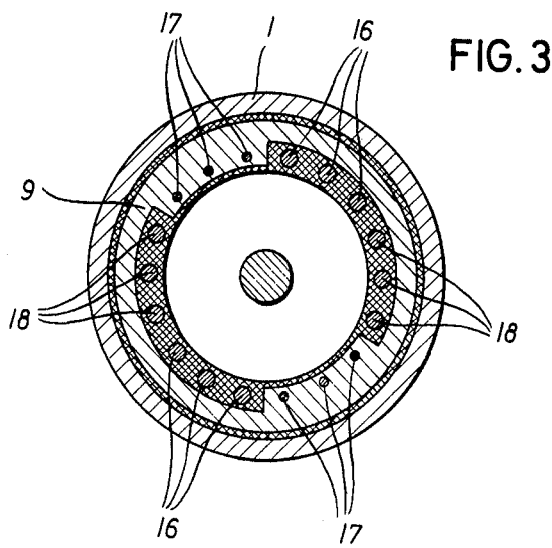
FIGURE 3 is a sectional view taken along the line III—III of FIGURE 1.
Figure 4:
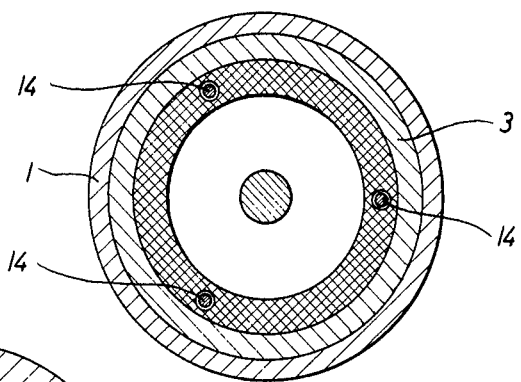
FIGURE 4 is a sectional view along the line IV—IV of FIGURE 1.
Figure 5:
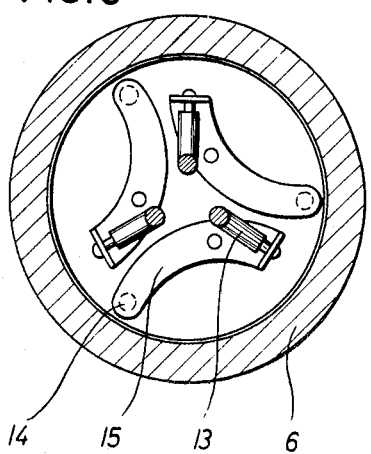
FIGURE 5 is a sectional view along the line V—V of FIGURE 1.

As FIGURE 1 shows, the motor comprises the motor housing 1, the laminated stator core 2, the closure cover 3, which at the same time acts as contact maker, the clamping ring 4 which clamps laminated stator core 2 and cover 3 in the housing 1, the rotor 5 provided with two ball bearings, and the closore cap 6 with supply cable 13. Inserted in the laminations 7 of the laminated stator core are the rod-like conductors 8 which are reduced in cross-section at their ends and are fixed at one end in groups in short-circuit rings 9 while at the other ends they are connected to one another in the contact pieces 10 and 11. As the upper part of FIGURE 1 shows, three short-circuit rings 9 are provided in accordance with the three phase windings, and each of these rings connects together a group of rod-like conductors. In the illustrated case, each group consists of six conductor elements which form a drum winding with diametral pitch. The cross-section in FIGURE 3 taken on the line III—III of FIGURE 1 shows the three conductor groups 16, 17 and 18. The conductors of the group 17 are short-circuited by a ring 9. The conductors of the two other groups 16 and 18 are taken in insulated fashion through this ring 9 and terminate respectively at one of the two other short-circuit rings 9. At the other end three adjacently situated conductors belonging to the same phase are connected to one another in each case by plates 10 and 11 respectively. In the case of star connection of the motor, the plates 10 are short-circuited by the cover 3 which forms the star center, while the plates 11 are connected to connecting pins 14 which are taken in insulated fashion through the cover 3 and at their other end are connected by means of springs 15 to the supply cable. FIGURE 4 shows a section on the line IV—IV of FIGURE 1 wherein the housing 1, cover 3 and the connecting pins 14 are surrounded by insulating material. The sectional view of FIGURE 5, taken on the line V—V of FIGURE 1 shows the closure cap 6, the three phase supply lines 13, the contact springs 15 and the ends of the pins 14.

The laminations 7, the short-circuit rings 9 and the contact pieces 10 and 11 are, except for the places at which they are to come into conductive contact with the conductor rods or contact pins, completely encased and insulated in casting resin 12. The manner of arranging this insulation is that the laminated stator core after it has been mechanically produced and the rod-like conductors inserted, has casting resin or another suitable insulating synthetic plastic material cast about it and is then appropriately machined.

Figure 2:
FIGURE 2 is a block schematic diagram showing the supply of the motor from the mains through a converter.
Figure 11:
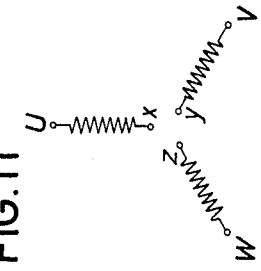
FIGURE 11 is a symbolic connection diagram (star connection), showing how
Figure 10:
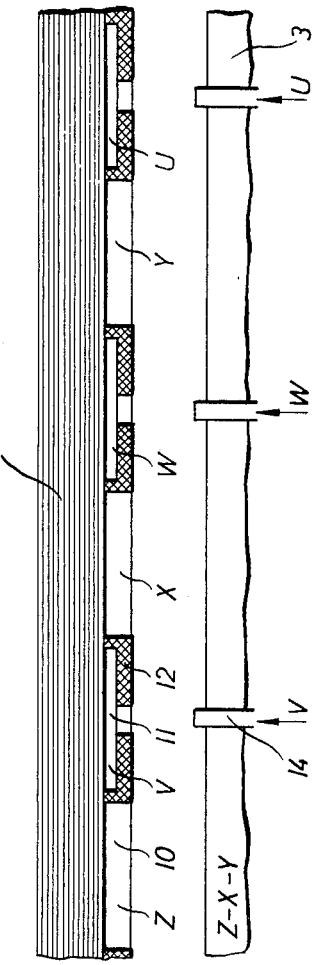
FIGURE 10 shows, in development, the lower part of the laminated stator core according to FIGURE 9 enclosed in casting resin, in conjunction with the appropriate switching and connecting elements of the closure cover.

The arrangement of the conductors in the laminated stator core and their connection to the short-circuit rings 9 and the connecting plates 10 and 11 will be more clearly visible from FIGURES 6 to 9. FIGURE 6 shows the entire laminated stator core with the short-circuit rings 9 and the contact pieces 10 and 11 in plan view taken perpendicularly to the line VI—VI of FIGURE 7, which is a side view of the laminated stator core of FIGURE 6 as viewed from the right. FIGURE 8 shows a side view of the laminated stator core as seen from the left, with the uppermost of the three short-circuit rings 9. In FIGURE 9, the same laminated stator core is shown in developed form with the short-circuit rings 9, the rod-like conductors 8, and their reduced ends 16, 17 and 18, which are inserted in groups of three rods each in the corresponding shot-circuit rings 9 and the contact pieces 10 and 11 respectively. The designations X, Y, Z and U, V, W in FIGURES 6, 7 and 9 show the association of the contact pieces 10 and 11 in the case of the drum winding used here with the phases of the three-phase mains. Then FIGURE 10 shows, again in development, the lower part of FIGURE 9 with the contact pieces which, however, are here surrounded by casting resin layer 12 and subsequently ground smooth. Against this partly resin and partly metal surface there presses the cover 3 with its contact ring as shown in the lower part of FIGURE 10, and the contact pins taken in insulated fashion through the said cover can contact the contact pieces 11 through holes in the insulating layer 12. In this very simple way, the star connection of the motor which is shown in FIGURE 11 is achieved. The contact ring of the cover 3 connects the ends X, Y and Z of the phase windings to one another, whilst the other ends U, V and W of the windings are connected through the contact pins 14 to the three phase lines of the converter (FIGURE 2).

Figure 13:
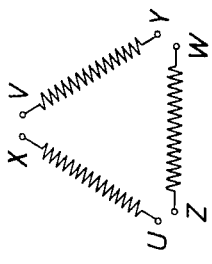
FIGURE 13 is a symbolic connection diagram (delta connection) showing how
Figure 12:
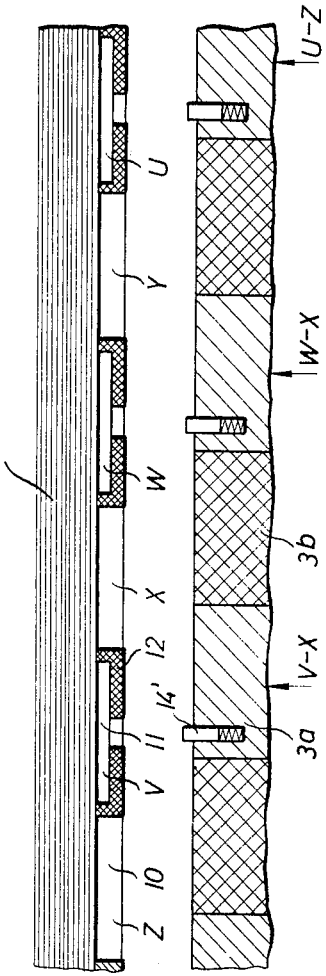
FIGURE 12 shows the lower part of the developed core according to FIGURE 9 when sealed in casting resin, with the corresponding switching and connecting elements of the cover for another circuit arrangemet.

FIGURE 12 shows how in a very simple manner and simply by interchanging the cover 3, without changing the construction of the laminated stator core, the delta connection of the motor shown in FIGURE 13 can be obtained. The cover in this case is composed alternately of conductive and insulating or insulation-covered pieces 3a and 3b, the pieces 3a containing resiliently preloaded pins 14' which make contact with the contact pieces 11 through holes in the insulating layer of the said contact pieces. Since, as FIGURE 12 shows, the conducting and the insulating parts of the cover are offset relatively to those of the laminated stator core, the winding ends V–X, W–Y and U–Z are in each case connected conductively to one another. The contact pins 14 of FIGURE 1 are in conductive connection with the lower sides of the parts 3a.

Figure 15:
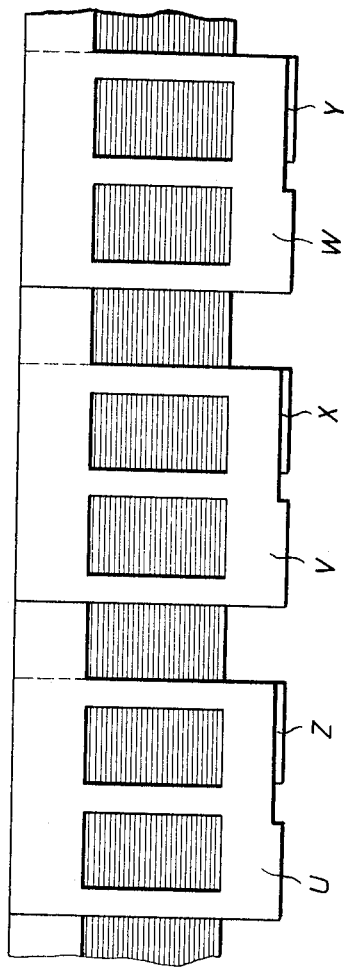
FIGURE 15 is a sectional and developed view of the laminated stator core according to FIGURE 16.
Figure 14:
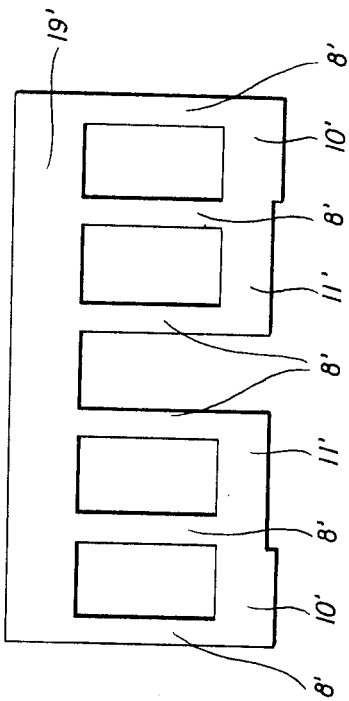
FIGURE 14 shows a punched part for another constructional form of the stator winding.
Figure 18:
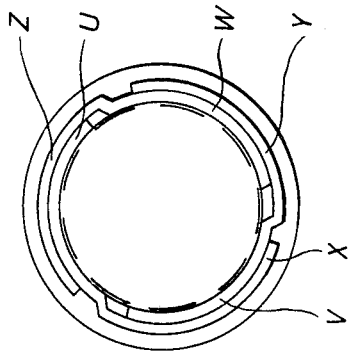
FIGURE 18 is a side view of the laminated stator core according to FIGURE 16 as seen from the left.
Figure 16:
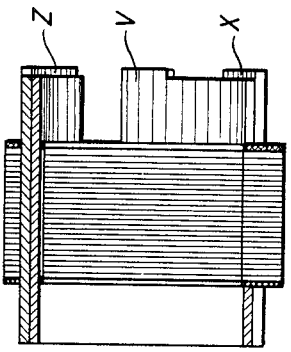
FIGURE 16 shows the complete laminated stator core in plan view perpendicularly to the line XVI—XVI of FIGURE 17 on a greatly enlarged scale, with the punched winding arranged therein.
Figure 17:
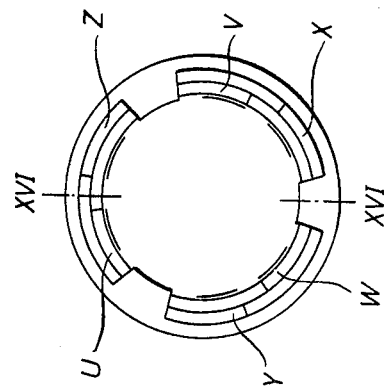
FIGURE 17 is a side view of the laminated stator core according to FIGURE 16 as seen from the right.

The stator arrangement described hereinbefore uses, for the winding, rods of suitable shape which are arranged in slots which can be closed or semi-open. But it is also possible for the winding to be made of shaped parts, preferably punched laminations, which must then be inserted in open slots of the laminated stator core. FIGURE 14 shows a punched part of this kind for a motor having a drum winding with fractional pitch. The shaped part contains six narrow webs 8' which are to be arranged as rod-like conductors in the slots of the laminated stator core. These conductors are connected together at their upper ends by an upper cross member 19', while each three of them are connected together at their lower ends by cross members 11'. These cross members 11' have projecting parts 10' which are used for current supply, coming into contact with the contact parts of the cover when the motor is assembled. The laminated stator core which is shown in FIGURE 16 in a view perpendicularly to the line XVI—XVI of FIGURE 17. The core contains nine slots into which are inserted three punchings of the form shown in FIGURE 14 which are each offset by the amount of three rod-like conductors, in such a manner that in each case one group of rod-like conductors of the punching appears externally and the other appears internally in the slots. Thus each slot contains a rod of one punching and a rod of the next punching. This is shown in FIGURES 17 and 18, wherein FIGURE 17 shows the laminated stator core of FIGURE 16 from the right and FIGURE 18 shows it as seen from the left. FIGURE 15 shows a development of the laminated stator core in which the ends U, V, W and X, Y, Z of the phase windings of the stator are shown in accordance with FIGURES 16–18. As will be readily apparent, in this embodiment there is no need to arrange short-circuit rings, since the connections belonging to each group of rod-like conductors are already provided by the connecting webs of the punchings.

FIGURES 19 through 23 show diagrammatically how the punchings can be electrically connected for star and for delta connections. FIGURES 19 and 22 again show the lower part of FIGURE 15 which shows the developed laminated stator core. FIGURES 20 and 21 show the bearing cover in side view and plan view, again in development, with the ring connecting the winding ends Z, X, Y, and the contact pieces which are in connection with the supply pins and which are designated as U, V, W in accordance with the phases. The arrangement provides a star connection. FIGURE 23 shows how the contact-making parts of the bearing cover must be constructed if the motor windings are to be connected in delta fashion.

Of course, it would also be possible to form the drum winding with diametral pitch described first with eighteen slots and rod-like conductors arranged therein by means of shaped parts consisting of punched laminations. In this case the upper web of FIGURE 14 connecting each two associated groups of conductors must be so long as to be capable of accommodating in the space thus formed between the conductors two groups of three conductors each.

It will be clear from the foregoing that according to the invention it is possible to provide a motor of as small a size as may be desired with great constructional precision, permitting the assembly of preformed parts in a very simple manner without requiring a winding process for the stator windings, and wherein the connections to the windings are effected by means of a bearing cover constructed in accordance with the desired circuit arrangement. Therefore, a motor according to the invention can be assembled very quickly without resulting in any inaccuracies.

What is claimed is:

1. A stator for a multiphase rotating machine comprising an iron core provided with a cylindrical central passageway for accommodating a rotor and a plurality of grooves opening into the inner wall of said iron core about said passageway, at least two laminations of electrically conductive material each of said laminations including a plurality of web members and upper and lower cross member means, said cross member means connecting said web members in electrically parallel relationship, each of said web members being disposed in one of said grooves, said upper cross member means being connected to all of said web members, said lower cross member means including distinct first and second portions, said first portion being connected to some of said web members and said second portion being connected to the remainder of said web members.

2. The stator of claim 1, wherein said first and second portions include projections for connecting said lower cross member means to electrical circuits.

3. A stator for a multiphase rotating machine comprising an iron core provided with a cylindrical central passageway for accommodating a rotor and a plurality of grooves opening into the inner wall of said iron core about said passageway, said grooves being aligned parallel to the rotor axis and being divided into at least first, second and third equal groups sequentially positioned equiangularly around said passageway, at least first, second and third laminations of electrically conductive material each of said laminations including a group of web portions equal to twice the number of grooves in a groove group, an upper cross portion connecting all of said web portions, a first lower cross portion connecting half of the web portions and a second lower cross portion connecting the remainder of the web portions, said web portions being disposed in said grooves in such a manner that each groove accommodates two web portions, each from a different lamination.

4. The stator of claim 3, wherein each groove accommodates a web portion from the first half of the web portions of one lamination and a web portion from the second half of the web portions of another lamination.

5. The stator of claim 3, wherein the first group of grooves accommodates the first half of the web portions of said first lamination and the second half of the web portions of said third lamination, the second group of grooves accommodates the second half of the web portions of said first lamination and the first half of the web portions of said second lamination, and said third group of grooves accommodates the second half of the web portions of said second lamination and the first half of the web portions of said third lamination.

6. The stator of claim 5, wherein in each groove the first half of the web portions of the one associated lamination overlie the second half of the web portions of the other associated lamination.

7. The stator of claim 5, wherein the first and second lower cross portions include, at mutually remote ends, extension portions adapted for connection to electrical circuits such that six unique electrical terminals are provided.

8. The stator of claim 7 further comprising a circuit connector means for connection to said six unique electrical terminals including electrical contact means positionable against said extension portions.

9. The stator of claim 8, wherein said circuit connector means includes a continuous ring of conductive material so shaped to contact only the extension portions of all of one of said lower cross portions, and three conductive segments each positioned to contact the extension portion of a different one of the other of said lower cross portions.

10. The stator of claim 8, wherein said circuit connector means includes three unique segments so positioned to contact pairs of extension portions, wherein each pair of extension portions includes the extension portion of the lower cross portion associated with the web portions of one of the laminations in one of the groups of grooves and the extension portion of the lower cross portion associated with the web portions of the other of the laminations in said one group of grooves.

References Cited by the Examiner

UNITED STATES PATENTS

| | | | |
|---|---|---|---|
| 911,081 | 2/1909 | Smoot et al. | 310—260 X |
| 1,381,505 | 6/1921 | Sandell | 310—211 X |
| 1,528,628 | 3/1925 | Powell | 310—68 |
| 2,695,369 | 11/1954 | Lloyd et al. | 310—87 |
| 2,802,124 | 8/1957 | Sjoblom | 310—211 |
| 2,944,297 | 7/1960 | Maynard | 18—59 |

MILTON O. HIRSHFIELD, *Primary Examiner.*

ORIS L. RADER, *Examiner.*

D. F. DUGGAN, *Assistant Examiner.*